United States Patent [19]

Tiner et al.

[11] 3,888,312

[45] June 10, 1975

[54] METHOD AND COMPOSITIONS FOR FRACTURING WELL FORMATIONS

[75] Inventors: Robert L. Tiner; Marlin D. Holtmyer, both of Duncan; Bobby J. King; Richard A. Gatlin, both of Marlow, all of Okla.

[73] Assignee: Halliburton Company, Duncan, Okla.

[22] Filed: Apr. 29, 1974

[21] Appl. No.: 465,378

[52] U.S. Cl.................................. 166/308; 166/300
[51] Int. Cl.² .......................................... E21B 43/26
[58] Field of Search .......... 166/308, 294, 300, 271, 166/281, 283, 305 R

[56] References Cited
UNITED STATES PATENTS 2,270,006  1/1942  Kennedy............................ 166/294
3,762,476  10/1973  Gill..................................... 166/294

FOREIGN PATENTS OR APPLICATIONS 245,945  9/1960  Australia............................. 166/294

*Primary Examiner*—Stephen J. Novosad
*Assistant Examiner*—George A. Suckfield
*Attorney, Agent, or Firm*—Thomas R. Weaver; John H. Tregoning

[57] ABSTRACT

A crosslinked aqueous gel useful for fracturing and placing propping agents within a subterranean formation is disclosed. The gel has a high viscosity in said formation and has pumping characteristics in turbulent flow similar to those of water.

29 Claims, No Drawings

METHOD AND COMPOSITIONS FOR FRACTURING WELL FORMATIONS

This invention relates to methods and compositions for the hydraulic fracturing of subterranean formations. It more particularly relates to methods and compositions for fracturing a subterranean well formation penetrated by a well bore wherein a fluid composition is injected into the formation via a suitable conduit at a rate and pressure sufficient to produce a fracture in the formation.

Hydraulic fracturing can be used to stimulate the production of oil and gas from wells completed in low permeability formations, accordingly, many methods and compositions useful for hydraulically fracturing subterranean well formations penetrated by a well bore have been developed.

Commonly, in the art of hydraulic fracturing, a fluid is introduced via a conduit, such as tubing or casing, disposed in the well bore into the formation sought to be fractured. The fluid is introduced at a rate and pressure sufficient to produce a fracture in the formation, and to extend the produced fracture from the well bore into the formation. The fluid can include a propping agent which results in placement of the propping agent within the fracture thus produced. Following the fracturing treatment, the introduced fluid is recovered from the formation but the proppant remains in the produced fracture to thereby prevent the complete closure thereof and to thereby form a propped fracture having a conductive channel extending from the well bore into the formation.

The conductivity of the propped fracture is effected by the particle size of the propping agent placed in the fracture. The particle size of the propping agent which can be used depends upon the width to which the particular fracture can be opened during the introduction of the fracturing fluid; and fracture width is normally directly proportional to the viscosity of the fracturing fluid. In addition, the use of fracturing fluids having relatively high viscosities is advantageous since such fluids can support the propping agent particles suspended therein without excessive settling.

The use of desirably high viscosity fracturing fluids, however, is accompanied by the problem of high friction losses usually encountered during the introduction of such fluids into a formation through the conduit disposed in the well bore. Accordingly, due to the friction loss problem, a desirably high viscosity fracturing fluid sometimes cannot be introduced into a formation at a rate high enough to produce a fracture wide enough to place propping agents therein. Such friction losses would require stronger tubular goods than are normally available at a well site and high pumping horsepower.

One method which can be utilized to overcome high friction loss experienced during the pumping of high viscosity fracturing fluids features introducing the fracturing fluid down the well bore accompanied by a less viscous liquid. The less viscous liquid functions as a lubricant and is accordingly injected as a layer between the fracturing fluid and the inner walls of the well tubing. This method requires sophisticated injection equipment. Furthermore, the fracturing fluids utilized in the lubricant method are generally high viscosity oils which, therefore, limit the usefulness of such a fracturing method to oil producing wells.

By the present invention there is provided a fracturing fluid and a fracturing method which solves the friction loss problem. Thus, according to this invention, a crosslinked gel comprising an aqueous liquid, a gelling agent and a crosslinking compound is provided which has a viscosity while in laminar flow, such as in subterranean formations, of about 25 centipoises and greater and up to about 100,000 centipoises, but which, while in turbulent flow, such as in a conduit, exhibits a resistance to fluid flow of less than that of water. The crosslinked gel of this invention can carry great quantities of propping agent into a formation sought to be fractured and can be introduced into the formation at suitably high rates with pumping equipment and tubular goods normally available at a wellhead. The need for a lubricating layer between the crosslinked gel fracturing fluid and the walls of the well tubing is eliminated.

The aqueous liquid utilized herein is defined as a water-alcohol solution having 0 to 100, preferably 0 to 80, and still more preferably 0 to 40, percent alcohol by volume of solution. The preferred alcohols are alkanols having 1 to 5 carbon atoms. Examples of alcohols believed to be useful in the aqueous liquid include methanol, ethanol, propanol, isopropanol, butanol, isobutanol, pentanol, furfuryl alcohol, ethylene glycol, and ethoxylated derivatives thereof.

The aqueous liquid is used to solvate the gelling agent prior to crosslinking. The pH of the aqueous liquid must be adjusted to render the aqueous liquid compatible with the crosslinking compound used to crosslink the solvated gelling agent (hereinafter referred to as the base gel). Adjustment of the pH of the aqueous liquid is not a critical step in the preparation of the base gel. The pH adjusting material can be added to the aqueous liquid before, during, or after the gelling agent is added to the aqueous liquid. The aqueous liquid should be relatively free of impurities of a size sufficient to interfere with the movement of the fluid in the conduit and pumping equipment used to introduce the crosslinked gel into the formation.

The gelling agent useful in the present invention is selected from solvatable polysaccharides having molecular weights of at least about 100,000. Examples of solvatable polysaccharides useful herein include the galactomannan gums, glucomannan gums, and cellulose derivatives. Solvatable galactomannan gums and glucomannan gums are naturally occurring; however, cellulose is rendered solvatable by reacting cellulose with hydrophillic constituents.

The galactomannan gums and glucomannan gums can also be reacted with hydrophillic constituents to thereby produce gelling agents useful herein.

Solvatable polysaccharides having molecular weights of less than about 100,000 do not form crosslinked gels which are useful herein. The most preferred solvatable polysaccharides useful herein have molecular weights in the range of from about 200,000 to about 300,000.

Guar gum, locust bean gum, karaya gum, sodium carboxymethylguar, hydroxyethylguar, sodium carboxymethylhydroxyethylguar, hydroxypropylguar, sodium carboxymethylhydroxypropylguar, sodium carboxymethylcellulose, sodium carboxymethylhydroxyethylcellulose, and hydroxyethylcellulose are examples of gelling agents useful herein. The hydroxyethylcellulose derivatives used as gelling agents should be those having between 0.5 and about 10 moles of ethylene oxide per anhydroglucose unit.

The preferred gelling agents are guar gum, sodium carboxymethylcellulose, and sodium carboxymethylhydroxyethylguar.

The most preferred gelling agents for use in the present invention are sodium carboxymethylcellulose and sodium carboxymethylhydroxyethylguar.

The gelling agent useful herein is present in the aqueous liquid in a concentration in the range of from about 0.3 to about 3%, preferably about 0.4 to 2%, and still more preferably from about 0.5 to about 1% by weight of the aqueous liquid. A gelling agent concentration of less than about 0.3% by weight of the aqueous liquid is not a sufficient quantity of gelling agent to provide the crosslinked gel of this invention.

The crosslinking compounds of the present invention feature the presence of titanium in the +4 oxidation state, i.e., titanium(IV). Ordinarily these compounds are organotitanates which are useful in crosslinking through available, active hydrogens. The term hydroxy crosslinking has been used to describe this reaction. In addition amino, amido, carboxyl, and thio groups, although sometimes less reactive, can be crosslinked with organotitanates.

An example of a titanium(IV) — containing crosslinking compound useful herein is ammonium tetralacetotitanate(IV). The chemical formula of ammonium tetralactotitanate(IV) is believed to be:

$(NH_4)_4^+[Ti(OC_2H_4COO)_4]^{-4}$

Another example of a titanium(IV) — containing crosslinking compound useful herein is bis(triethanolamine)bis(isopropol)-titanium(IV) having the chemical formula

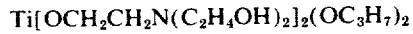

$Ti[OCH_2CH_2N(C_2H_4OH)_2]_2(OC_3H_7)_2$

The preferred organotitanate is ammonium tetralactotitanate(IV).

The crosslinking reaction mechanism is not fully understood. However, it is believed that the titanium does not experience any sort of valence change during the crosslinking reaction.

The amount of crosslinking compound useful to form the crosslinked gel of this invention is in the range of from about 0.003 to in excess of 0.5 percent by weight of the aqueous liquid. The preferred concentrations of crosslinking compound are in the ranges of from about 0.006 to about 0.25, and still further preferred about 0.009 to about 0.1 percent by weight of the aqueous liquid.

The above concentrations of crosslinking compound refer to undiluted forms of the material. It is more convenient, and thus preferred, to admix the base gel with a solution of the crosslinking compound. The solution is, broadly, any aqueous solution, however, water and/or alcohol solutions are presently preferred. Accordingly, appropriate calculations are required — based upon the above concentration ranges — when the compound is added in diluted solution form. Convenient crosslinking compound solutions are in the range of from about 0.5 to about 50% crosslinking compound by weight of solution.

Conventional propping agents can be employed with the fracturing fluid compositions of the present invention, examples of which are quartz sand grains, tempered glass beads, rounded walnut shell fragments, aluminum pellets, nylon pellets and similar materials. Propping agents are generally used in concentrations in the range of from about 1 to about 8 pounds per gallon of the aqueous liquid; however, higher or lower concentrations may be used as required. The particle size of propping agent employed is a function of the nature of the formation to be fractured, the pressure required to produce the fracture, and pumping fluid flow rates available, as well as other known factors. However, particle sizes in the range of about 200 to about 2 mesh on the U.S. Sieve Series scale can be employed in fracturing well formations with the compositions of the present invention.

The crosslinked gel of the present invention is used by introducing it — ordinarily by pumping — into a well bore traversing the subterranean formation sought to be fractured. The gel is pumped at a flow rate sufficient to fracture the formation and to place propping agents in the fracture.

The crosslinked gel can be prepared for use by mixing a predetermined quantity of the solvatable polysaccharide gelling agent with a quantity of aqueous liquid to form a solvated gel referred to herein as the base gel. Any conventional batch mixing apparatus can be employed for this purpose. After the gelling agent and the aqueous liquid have been mixed for a time sufficient to form the base gel, a quantity of crosslinking compound is mixed with the base gel, and the mixture is pumped into the well bore as the crosslinking reaction takes place. Propping agents are generally added to the base gel prior to the addition of the crosslinking compound as the base gel is introduced into the well bore.

The crosslinked gels of this invention can be made over a wide pH range with the crosslinking compounds useful herein and the resulting gels can be used for fracturing subterranean formations; however, since it is the preference of the oil industry to use either neutral or acidic fluids for fracturing in order to avoid undesirable swelling and migration of clays in the formation which could be caused by basic fluids, the crosslinking reaction herein for forming the crosslinked gels of the present invention is preferably conducted in a pH range of 7 or below.

The rate at which the crosslinking reaction proceeds at normal temperature (about 60°F to about 120°F) is a function of the pH of the base gel. Accordingly, to assure that the crosslinking reaction takes place in the desired period of time, the pH of the aqueous liquid or of the base gel can be adjusted to a desired level within the range of from about pH 1.5 to about pH 7 by the addition of a pH adjusting chemical. Since water from most sources is substantially neutral, the chemical or chemicals used for this purpose can be acids, acid buffers, mixtures thereof, or mixtures of acids and bases. Examples of suitable acids are hydrochloric acid, formic acid, fumaric acid, and phthalic acid. Examples of suitable buffers are potassium biphthalate, sodium hydrogen fumarate, and sodium bicarbonate. Examples of mixtures of acids and bases are fumaric acid and sodium fumarate, adipic acid and sodium bicarbonate, and fumaric acid and sodium carbonate.

A presently preferred process for fracturing a subterranean formation penetrated by a well bore comprises injecting down the well and into the formation, at a pressure sufficient to fracture the formation, a fluid comprising a crosslinked gel which is prepared by adding 40 to 70 pounds of sodium carboxymethylcellulose to each 1,000 gallons of aqueous liquid containing about 0 to about 40% by volume methanol, wherein the pH of the aqueous liquid is preferably greater than 2 and less than 7, said pH having been first adjusted by addition of a sufficient quantity of a buffering agent such as fumaric acid, formic acid, and/or sodium bicarbonate to the aqueous liquid to thus prepare a base gel. The base gel is introduced into the well bore and, as it is introduced, there is admixed with it an organotitanate compound in a 50% by weight water solution. The organotitanate solution is mixed with the base gel at the rate of 0.1 gallons solution per each 10 pounds of sodium carboxymethylcellulose per each 1,000 gallons of aqueous solution. Accordingly, if 50 pounds of sodium carboxymethylcellulose are employed in the base gel, then 0.5 gallons of organotitanate solution are added per each 1,000 gallons of aqueous liquid.

The organotitanate, in which titanium is present in the +4 valence state, is added to the base gel to initiate crosslinking of the sodium carboxymethylcellulose.

After the crosslinked gel has been pumped into the subterranean formation and a fracture has been formed, it is desirable to convert — referred to as breaking — the gel into a low viscosity fluid so that it can be recovered from the formation through the well bore. There are various methods available for breaking the crosslinked gel of the present invention. The crosslinked gels of the present invention break after passage of time and/or prolonged exposure to high temperatures. However, it is desirable to be able to predict breaking time within relatively narrow limits. Therefore, breakers can be optionally included in the crosslinked gel of the present invention. Mild oxidizing agents are useful as breakers when a crosslinked gel is used in a relatively high temperature formation, although formation temperatures of 200°F or greater will generally break the gel relatively quickly without the aid of an oxidizing agent. A suitable oxidizing agent is ammonium persulfate. For crosslinked gels used at temperatures below about 140°F, enzymes are generally used as breakers. Suitable enzymes for such use are alpha and beta amylases, amyloglucosidase, oligoglucosidase, invertase, maltase, cellulase and hemicellulase.

When a crosslinked gel is used for fracturing a subterranean formation, it is desirable that the crosslinking proceed while the gel is traversing the well bore toward the formation. If crosslinking occurs either in or prior to entering the pumps, pumping difficulty might be encountered. If crosslinking does not occur before the gel reaches the formation, the gel will not have the viscosity required to place large quantities of sand in the formation.

The crosslinked gel of the present invention does have sufficient viscosity to enable it to maintain the properties of a semisolid substance for long periods of time. Sufficient viscosity is an indication that the gel will remain in place in the formation and that it will support large propping agents for great lengths of time.

The crosslinked gel of the present invention has been found to have a high viscosity in an earth formation, although it can be pumped through a conduit with a fluid flow resistance less than that of water. It has been found that while flowing through a conduit the gel is subjected to turbulent shear and its viscosity is reduced. However, when the rate of flow is reduced as the crosslinked gel enters the formation, it regains the high viscosity which enables it to fracture the formation and to carry a propping agent into the formation.

The following examples will enable persons skilled in the art to further understand and practice the invention; however, the examples are not intended to limit the scope of this invention.

EXAMPLE 1

A total of 250 grams of potable water is placed in a 1-liter blender jar, then 1.8 grams of sodium carboxymethylhydroxyethylguar and 0.15 grams of fumaric acid are added to the jar while stirring. The solution is allowed to solvate for 30 minutes to thereby form a base gel. This base gel has a viscosity of 62 centipoises and a pH of 3.6. The viscosity is measured with a Model 35 Fann viscometer at 300 rpm. To this base gel is added one gram of a water solution containing 0.135 grams of ammonium tetralactotitanate(IV). The gel complexes in about 15 seconds with a final viscosity of about 24,000 centipoises, as measured on a Brookfield LVF viscometer with a No. 3 spindle at 6 rpm.

EXAMPLE 2

A gas well producing from a formation 12,000 feet below the surface and equipped with 2½ inches tubing was fracture treated in accordance with the process of this invention.

To fracture the formation, 42,000 gallons of fresh water which contained 2% by weight potassium chloride was gelled with 3,000 pounds of sodium carboxymethylcellulose. The gel was allowed to solvate for 1 hour. To this gel was added 500 pounds of fumaric acid and 18,000 gallons of methanol. This resulted in a base gel having a pH of 3.2 and a viscosity of 60 centipoises as measured with a Fann viscometer at 511 reciprocal seconds.

During pumping of the base gel, 300 gallons of a water solution containing 13.5 pounds of ammonium tetralactotitanate(IV) was added to the base gel. The base gel crosslinked in about 20 seconds. The calculated viscosity in the fracture was about 500 centipoises. Immediately prior to pumping, sand was added to the base gel at an average concentration of 2 pounds per gallon.

The crosslinked gel was pumped at a fracturing rate of 10 bpm down the tubing to create a fracture. The friction pressure observed during the treatment was about 11,700 psi. (The friction pressure of fresh water under the same conditions has been measured to be about 14,600 psi.)

This treatment was very successful and resulted in a fourfold increase in gas production.

This invention is not limited to the above described specific embodiments thereof; it must be understood therefore that the detail involved in the descriptions of the specific embodiments is presented for the purpose of illustration only, and that reasonable variations and modifications, which will be apparent to those skilled in the art, can be made in this invention without departing from the spirit or scope thereof.

Having thus described the invention, that which is claimed is:

1. A process for fracturing a subterranean formation which comprises
   introducing into said formation a crosslinked gel at a flow rate and pressure sufficient to produce a fracture in said formation;
   wherein said crosslinked gel is comprised of an aqueous liquid, a gelling agent selected from solvatable polysaccharides having molecular weights of at least about 100,000, and a crosslinking compound selected from organotitanates having titanium in the +4 oxidation state.

2. The process of claim 1 wherein said solvatable polysaccharides are selected from galactomannan gums, glucomannan gums, and cellulose derivatives.

3. The process of claim 1 wherein said solvatable polysaccharides have molecular weights in the range of from about 200,000 to about 300,000.

4. The process of claim 1 wherein said solvatable polysaccharides are selected from guar gum, locust bean gum, karaya gum, sodium carboxymethylguar, hydroxyethylguar, sodium carboxymethylhydroxyethylguar, hydroxypropylguar, sodium carboxymethylhydroxypropylguar, sodium carboxymethylcellulose, sodium carboxymethylhydroxyethylcellulose, and hydroxyethylcellulose.

5. The process of claim 1 wherein said gelling agent is present in said aqueous liquid in a concentration in the range of from about 0.3 to about 3% by weight of said aqueous liquid.

6. The process of claim 1 wherein said aqueous liquid is a water - alcohol solution having in the range of about zero to 100% alcohol by volume of solution.

7. The process of claim 6 wherein said alcohol is selected from alkanols having 1 to 5 carbon atoms.

8. The process of claim 1 wherein said organotitanate is selected from ammonium tetralactotitanate(IV) and bis(triethanolamine)bis(isopropol)titanium(IV).

9. The process of claim 1 wherein said organotitanate is present in the range of from about 0.003 to in excess of about 0.5% by weight of said aqueous liquid.

10. A process for hydraulically fracturing a subterranean formation penetrated by a well bore which comprises
preparing a base gel by mixing an aqueous liquid with a gelling agent selected from solvatable polysaccharides having molecular weights of at least about 100,000,
introducing said base gel into said well bore in admixture with a crosslinking compound selected from organotitanates having titanium in the +4 oxidation state,
permitting said base gel and said crosslinking compound to react in said well bore to form a crosslinked gel, and
introducing said crosslinked gel into said formation from said well bore at a flow rate and pressure sufficient to produce a fracture in said formation.

11. The process of claim 10 wherein said aqueous liquid is a water - alcohol solution having in the range of about 0 to about 80% alcohol by volume of solution.

12. The process of claim 10 wherein the pH of said aqueous liquid is not more than about 7.

13. The process of claim 11 wherein said solvatable polysaccharides are selected from galactomannan gums, glucomannan gums, and cellulose derivatives, and further wherein said solvatable polysaccharides have molecular weights in the range of from about 200,000 to about 300,000.

14. The process of claim 11 wherein said solvatable polysaccharides are selected from guar gum, locust bean gum, karaya gum, sodium carboxymethylguar, hydroxyethylguar, sodium carboxymethylhydroxyethylguar, hydroxypropylguar, sodium carboxymethylhydroxypropylguar, sodium carboxymethylcellulose, sodium carboxymethylhydroxyethylcellulose, and hydroxyethylcellulose.

15. The process of claim 14 wherein said gelling agent is present in said aqueous liquid in a concentration in the range of from about 0.4 to about 2.0% by weight of said aqueous liquid.

16. The process of claim 15 wherein said organotitanate is selected from ammonium tetralactotitanate(IV) and bis(triethanolamine)bis(isopropo)titanium(IV), and further wherein said organotitanate is present in the range of from about 0.006 to about 0.25% by weight of said aqueous liquid.

17. The process of claim 16 wherein said crosslinking compound is present in an aqueous solution in the range of about 0.5 to about 50% by weight of said aqueous solution upon being admixed with said base gel.

18. The process of claim 17 wherein said aqueous solution is comprised of said crosslinking compound dissolved in liquids selected from water, alcohol and mixtures of water and alcohol.

19. The process of claim 18 wherein the pH of said aqueous liquid is adjusted with a pH adjusting chemical to a value in the range of about 1.5 to about 7 prior to admixing said base gel and said crosslinking compound, wherein said pH adjusting chemical is selected from acids, acid buffers, mixtures of acids and acid buffers and mixtures of acids and bases.

20. The process of claim 19 wherein said alcohol in said aqueous liquid is selected from alkanols having 1 to 5 carbon atoms.

21. A process for producing a fracture in a subterranean well formation penetrated by a well bore comprising:
preparing a base gel by adding in the range of about 40 to about 70 pounds of a gelling agent selected from guar gum, sodium carboxymethylhydroxyethylguar and sodium carboxymethylcellulose to each 1,000 gallons of an aqueous liquid;
introducing said base gel into said well bore and admixing with said base gel in said well bore an aqueous solution of an organotitanate compound having titanium in the +4 oxidation state, wherein said organotitanate compound is present in said aqueous solution in the amount of about 50% by weight of said aqueous solution and further wherein said aqueous solution containing said organotitanate compound is added to said base gel at the rate of about 0.1 gallons per each 10 pounds of said gelling agent added to each 1,000 gallons of said aqueous liquid;
permitting said base gel and said organotitanate compound to react in said well bore to form a crosslinked gel; and
injecting said crosslinked gel into said formation from said well bore at a flow rate and pressure sufficient to produce a fracture in said formation.

22. The process of claim 21 wherein the pH of said aqueous liquid is adjusted to a value in the range of about 2 to 7 prior to preparation of said base gel.

23. The process of claim 22 wherein said pH is adjusted by adding to said aqueous liquid a sufficient quantity of an agent selected from fumaric acid, formic acid, and sodium bicarbonate.

24. The process of claim 23 wherein said aqueous liquid is an alkanol-water solution comprising 0 to about 40 percent alkanol by volume of solution, said alkanol containing in the range of about 1 to 5 carbon atoms.

25. The process of claim 24 wherein said alkanol is methanol.

26. The process of claim 25 wherein said organotitanate is ammonium tetralactotitanate(IV).

27. The process of claim 24 wherein said organotitanate is bis(triethanolamine)bis(isopropo)titanium(IV).

28. The process of claim 26 wherein said gelling agent is sodium carboxymethylcellulose.

29. The process of claim 27 wherein said gelling agent is sodium carboxymethylcellulose.

* * * * *